United States Patent
Wells Campagna et al.

(10) Patent No.: US 11,819,034 B2
(45) Date of Patent: Nov. 21, 2023

(54) CUTTING ASSEMBLY FOR TRIMMING PIECES OF MEAT, PROCESSING SYSTEM INCLUDING SUCH A CUTTING ASSEMBLY, AND CORRESPONDING METHODS OF OPERATING AND USE ASSOCIATED THERETO

(71) Applicant: Équipements Frontmatec Inc., St-Anselme (CA)

(72) Inventors: Antoine Wells Campagna, St-Anselme (CA); Kevin Bergeron, St-Anselme (CA); Alexandre Lemieux, St-Anselme (CA)

(73) Assignee: Equipements Frontmatec Inc., St-Anselme (CA)

( * ) Notice: Subject to any disclaimer, the term of this patent is extended or adjusted under 35 U.S.C. 154(b) by 460 days.

(21) Appl. No.: 16/633,771

(22) PCT Filed: Jul. 25, 2018

(86) PCT No.: PCT/CA2018/050904
§ 371 (c)(1),
(2) Date: Aug. 17, 2020

(87) PCT Pub. No.: WO2019/018936
PCT Pub. Date: Jan. 31, 2019

(65) Prior Publication Data
US 2020/0236953 A1 Jul. 30, 2020

Related U.S. Application Data

(60) Provisional application No. 62/536,736, filed on Jul. 25, 2017.

(51) Int. Cl.
*A22C 17/00* (2006.01)
*A22B 5/00* (2006.01)
*A22C 17/12* (2006.01)

(52) U.S. Cl.
CPC ...... *A22C 17/0006* (2013.01); *A22C 17/0086* (2013.01); *A22B 5/0035* (2013.01);
(Continued)

(58) Field of Classification Search
CPC ............ A22C 17/0006; A22C 17/0086; A22C 17/0046; A22C 17/12; A22B 5/0035; A22B 5/0041
See application file for complete search history.

(56) References Cited

U.S. PATENT DOCUMENTS 5,133,687 A   7/1992  Malloy
5,746,106 A * 5/1998  Hodges .............. A22C 17/0006
                                                    83/873

(Continued)

FOREIGN PATENT DOCUMENTS

EP       1174034 A1    1/2002

*Primary Examiner* — Richard T Price, Jr.
(74) *Attorney, Agent, or Firm* — GableGotwals

(57) ABSTRACT

A cutting assembly and corresponding workpiece processing for cutting a workpiece, the cutting assembly including a first cutting tool adapted to cut the workpiece along a first cutting plane, and a second cutting tool adapted to cut the workpiece along a second cutting plane, the first and second cutting planes defining an inner angle therebetween, the cutting assembly being adapted to cut the workpiece along the first and second cutting planes in a single operation.

19 Claims, 17 Drawing Sheets

(52) U.S. Cl.
CPC ......... *A22B 5/0041* (2013.01); *A22C 17/0046* (2013.01); *A22C 17/12* (2013.01)

(56) References Cited

U.S. PATENT DOCUMENTS

| | | | |
|---|---|---|---|
| 5,759,086 A | 6/1998 | Klingel | |
| RE36,664 E * | 4/2000 | O'Brien | A22B 5/0029 452/157 |
| 6,155,919 A | 12/2000 | Haagensen et al. | |
| 6,547,658 B2 | 4/2003 | Boody et al. | |
| 7,404,759 B2 * | 7/2008 | Sato | A22B 5/0041 452/157 |
| 7,635,294 B2 | 12/2009 | Tomcak et al. | |
| 2002/0019208 A1 * | 2/2002 | Boody | A22C 17/0046 452/171 |
| 2006/0052043 A1 * | 3/2006 | Couture | A22C 17/0046 452/171 |
| 2007/0184767 A1 * | 8/2007 | Roy | A22C 17/0046 452/171 |
| 2008/0026684 A1 | 1/2008 | Tomcak et al. | |
| 2010/0304652 A1 * | 12/2010 | Bolte | A22C 17/0046 452/156 |
| 2018/0029246 A1 * | 2/2018 | Blaine | B26F 3/004 |
| 2020/0316191 A1 * | 10/2020 | Levy | C07K 16/1063 |
| 2022/0053783 A1 * | 2/2022 | Hofmann | A22C 17/0086 |

* cited by examiner

CUTTING ASSEMBLY FOR TRIMMING PIECES OF MEAT, PROCESSING SYSTEM INCLUDING SUCH A CUTTING ASSEMBLY, AND CORRESPONDING METHODS OF OPERATING AND USE ASSOCIATED THERETO

CROSS-REFERENCE TO RELATED APPLICATIONS

This United States application is the National Phase of PCT Application No. PCT/CA2018/050904 filed 25 Jul. 2018, which claims priority to U.S. Provisional Application No. 62/536,736 filed 25 Jul. 2017, each of which is incorporated herein by reference.

FIELD OF THE INVENTION

The technical field generally relates to a method of trimming a generic item, such as a piece of meat, for example, using a cutting assembly adapted for such an operation.

BACKGROUND OF THE INVENTION

Methods, machines and different accessories used in the processing/cutting/trimming of meat cuts, such as pork bellies are known in the art.

For example, it is known in the art that a standard machine for trimming pork bellies can comprise a series of vertical cutters adapted for trimming all four sides of the belly. In normal conditions, four cutters are used for trimming the four sides of a belly. However, it is well known in the art to use at least two extra cutters, built-in spares, ready to be used in case of an emergency such as a problem with any of the other cutters. Many drawbacks emerged from the use of these types of machines such as wastage of meats due to vertical cuts and a lack of side beveling capacity among others.

Export bellies or sheet bellies often need to fulfill dimensional specifications, such as a rectangular cut having a width of 22 cm and a length of 54 cm. Additionally, a plurality of specifications can be required such as cutline thickness, width variation and visible teat fat, among others. Additionally, specifications may include one or more bevels on the edges as seen from the fat side of the bellies.

Traditionally, workers hand-cut the bellies with a knife using a fixed dimensions template or using saws or are using machines to perform the dimensional cuts. In order to perform a bevel adequately by hand, one requires said belly to be flipped along the workline/conveyor. Additionally, the fact that beveling often does not need to be done on the complete edge of the bellies, workers are often asked to bevel only a fat portion extending between the back side of the belly and the first line of lean. On the teat side of the bellies, workers may also be asked to bevel the fat and/or remove the nipples. This method presents many drawbacks such as requiring large workstations with multiple steps for cutting/trimming the belly, and additional manpower for each additional steps, among others. Moreover, the additional handling, stretching and flipping of the bellies may generate excessive meat cut off and/or create bellies out of specifications. For example, workers sometimes had to remove fat in successive steps which resulted in over-trimming the bellies.

Several years ago, cutting machines were upgraded to enable such bevel cutting on the scribe and teat sides of the bellies. The bevels are however produced by a single cut from the surface to the bottom and are aiming to trim off the nipples and remove excessive fat, among others. A schematic of this cut can be seen in FIG. 3. It is important to see that the resulting bevel as an approximate angle of 45 degrees and finishes very thin on the surface of the belly. It should be noted that while the sides of the bellies are beveled, the ends of the bellies (i.e. the ham and shoulder ends) are not beveled, which would require more components and therefore more space, etc.

As such, to produce bellies with these specifications, side bevels have been positioned in order to remove visible surface fat on the teat side while globally satisfying dimensions. A top view of this specification is illustrated in FIG. 1. The A-A lines representing vertical cuts done on the shoulder and bootjack ends of the pork belly. The B-B lines representing the top portion of the belly where the bevels are started while the C-C lines are the location where the beveled cuts end on the conveyor belt. It should be noted that the linearity of lines B-B can depend on the thickness of the bellies being cut, while lines C-C will generally be straight. FIG. 2 illustrates a belly cross-section after performing such a beveled cut. Following this procedure, the top dimensions of the belly are 22 cm×54 cm (approx.) which corresponds to the rectangle made with the A-A and B-B lines.

The beveled cuts described above have been used in production successfully for almost 10 years. One of the drawback of this technique is the fact that the cuts create very thin edges on the bellies. In fact, the thickness will spread from the belly side full thickness down to 0". This means that significant portions of the belly are thinner than 0.5" which for some products could be considered as a defect. In addition, creating full 45-degrees bevels while fulfilling dimensions/visual requirements necessarily means that too much meat is cut off from the final end-product and could result in a massive yield opportunity. Finally, another known drawback of this technique is the inability to execute a perfect beveling angle (e.g., 45-degree angle). If the belly is misaligned on the conveyor (i.e., angled with respect to the direction of the conveyor), the resulting angled cut will not be identical to the previous angled cut.

The production of double angle edges on the pork bellies is also known in the art. For example, FIG. 4 illustrates a schematic view of the resulting edge on the belly which is composed of a vertical section on the top and an angled portion on the bottom. In this example, the 0" teat fat width specification is fulfilled with a cut perpendicular to the teat fat/lean frontier. FIG. 5 displays the result of a double-angled edge on a belly. It should be noted that the angled cut, or bevel, is performed after having flipped the pork belly, therefore requiring more handling and manipulation while processing the pork bellies.

FIG. 6 illustrates once again a top view of an export product belly with specification-respecting dimensions of 22 cm×54 cm (approx.) which are the dimensions formed by the solid lines. Those cuts are all vertical and perpendicular to the conveyor belt. The angle cut is started slightly below the side line and extends to the inside of the belly—the intersections of the bevel cuts and the conveyor belt are represented by the dotted lines. Additionally, FIG. 7 illustrates a belly cross-section after cutting the workpiece along two different angles. It can be seen that the bevels are much narrower than those shown in FIG. 2.

When comparing the resulting edges of a double-angled cut with the single beveled cut illustrated in FIG. 2, it is easily understandable that using a double-angled cut provides a substantial yield improvement while still meeting belly dimensional specifications. FIG. 8 displays the comparison of both edges. While the top line represents the single bevel cut, the bottom line illustrates the new double-angled cut. The portion in gray can be seen as a long trapezoidal prism volume that is simply the meat left on the belly instead of trimmings. It is important to note that the top dimensions remain essentially the same in both cases.

However, these double angled edges are produced using a multiple step process and generally necessitate manual labor. For example, the bellies need to be flipped upside down in order for a machine, or a worker, to perform the angle cut on the underside of the belly which presents many drawbacks as the ones presented above.

Also known to the Applicant is EP patent application No. 1,174,034 published on January 2002, to LARREAU et al., and relating to a "method for trimming pork bellies". Namely, this document describes a method for portioning hog carcass sides. In one use of the invention, the hog carcass is portioned according to a computer-generated scribe line. The scribe line is generated by mapping the endpoints of lean lines of meat. The method contemplates generating a scribe line without thickness mapping of the actual scribe line. The invention may be used in hog butchering processes where industry standards mandate portioning of the fatback be made with relation to the scribe line. Trimming of the belly can be carried out using the computer-generated scribe line as well.

Despite these known improvements, there is always a need to continue innovating and finding better and/or different ways of cutting/trimming pork bellies, in a more efficient, more precise, more accurate, more reliable, more adjustable, more versatile, more adaptable, more impactful, and/or more desirable manner (ex. depending on the circumstances, and the intended results, etc.).

Thus, it would be particularly useful to be able to provide a new cutting assembly which, by virtue of its design and components, would be able to overcome or at least minimize some of the known drawbacks associated with conventional cutting assemblies, for example.

SUMMARY OF THE INVENTION

An object of the present disclosure is to provide a cutting assembly which, by virtue of its design and components, is intended to satisfy the above-mentioned need and which is thus an improvement over other related cutting assemblies, corresponding associated accessories and/or cutting apparatus, systems, devices and/or methods known in the prior art.

In accordance with the present disclosure, the above main object is achieved, as will be easily understood, with a cutting assembly such as the one(s) briefly described herein and such as the one exemplified and/or alluded to in the accompanying drawings.

More particularly, according to one aspect, there is provided a cutting assembly for use within a processing system for cutting a workpiece, the cutting assembly comprising:

a first cutting tool adapted to cut the workpiece along a first cutting plane;

a second cutting tool adapted to cut the workpiece along a second cutting plane;

the first and second cutting planes defining an inner angle therebetween, the cutting assembly being adapted to cut the workpiece along said first and second cutting planes in a single operation.

According to another aspect, there is also provided a workpiece processing system for processing a given workpiece, the workpiece processing system comprising:

a conveying assembly adapted to convey the workpiece along a predetermined path; and a cutting assembly provided about the conveying assembly, said cutting assembly comprising a first cutting tool adapted to cut the workpiece along a first cutting plane, and a second cutting tool adapted to cut the workpiece along a second cutting plane, the first and second cutting planes defining an inner angle therebetween, the cutting assembly being adapted to cut the workpiece along said first and second cutting planes in a single operation.

As will be explained in greater detail hereinbelow, the present assembly/system is particularly advantageous in that, due to its components and features, it enables, or at the very least, it aims to: reduce operation time of cutting assemblies; reduce overall processing time of the workpieces; reduce maintenance cost of equipment; increase yield; and many more which will become more apparent, as explained hereinbelow.

According to another aspect, there is provided a method of operating and/or using the above-mentioned cutting assembly and/or associated accessory(ies)/component(s) thereof.

According to yet another aspect, there is provided an assembly, a system, a station and/or a machine for carrying out the above-mentioned method(s).

According to still another aspect, there is provided a manufacturing plant, factory and/or a slaughterhouse provided with any one and/or at least one of the above-mentioned assembly, system, station, machine and/or component(s) thereof.

According to another aspect, there is provided a method of manufacturing (ex. producing, assembling, etc.) the above-mentioned cutting assembly, accessory(ies)/component(s) thereof, assembly, system, station, machine, processing plant and/or component(s) thereof.

According to another aspect, there is provided a method of operating the above-mentioned assembly, system, station, machine, manufacturing plant and/or component(s) thereof.

According to another aspect, there is provided a kit with corresponding components for assembling the above-mentioned cutting assembly, associated accessory(ies) and/or component(s) thereof.

According to yet another aspect, there is also provided a set of components for interchanging with components of the above-mentioned kit.

According to yet another aspect, there is also provided a method of assembling components of the above-mentioned kit and/or set.

According to yet another aspect, there is also provided a method of doing business with the above-mentioned cutting assembly, associated accessory(ies) and/or component(s) thereof, method(s), kit, set, assembly, system, station, machine, manufacturing plant and/or part(s) thereof.

The objects, advantages and other features described above will become more apparent upon reading of the following non-restrictive description of preferred embodiments thereof, given for the purpose of exemplification only, with reference to the accompanying drawings.

DETAILED DESCRIPTION OF PREFERRED EMBODIMENTS OF THE INVENTION

Figure 1:
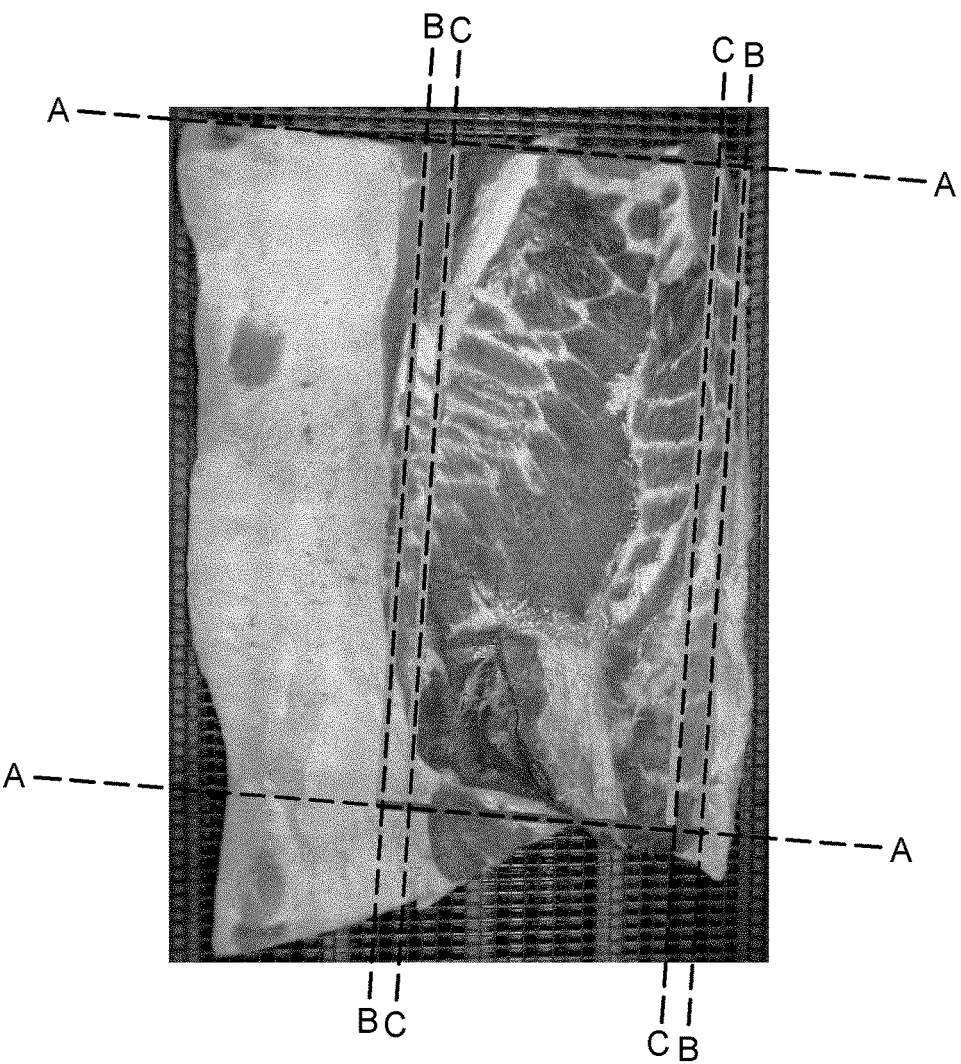
FIG. 1 is a top plan view of a pork belly with representations of cutting lines in accordance with the prior art.
Figure 2:
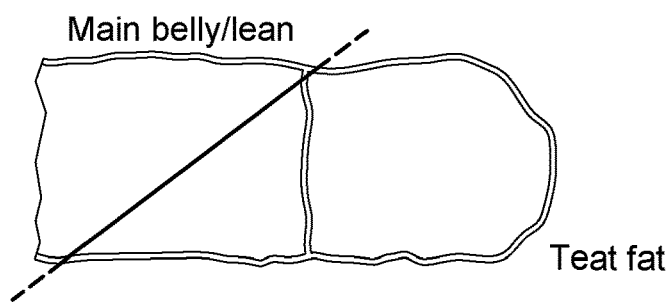
FIG. 2 is a schematic view of a cross-section of a portion of a pork belly, illustrating the location of a single beveled cut, generally separating the lean meat from the teat fat, in accordance with the prior art.
Figure 3:
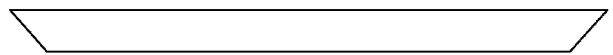
FIG. 3 is a schematic view of a cross-section of a pork belly which has been trimmed using the single beveled cut shown in FIG. 2.
Figure 4:
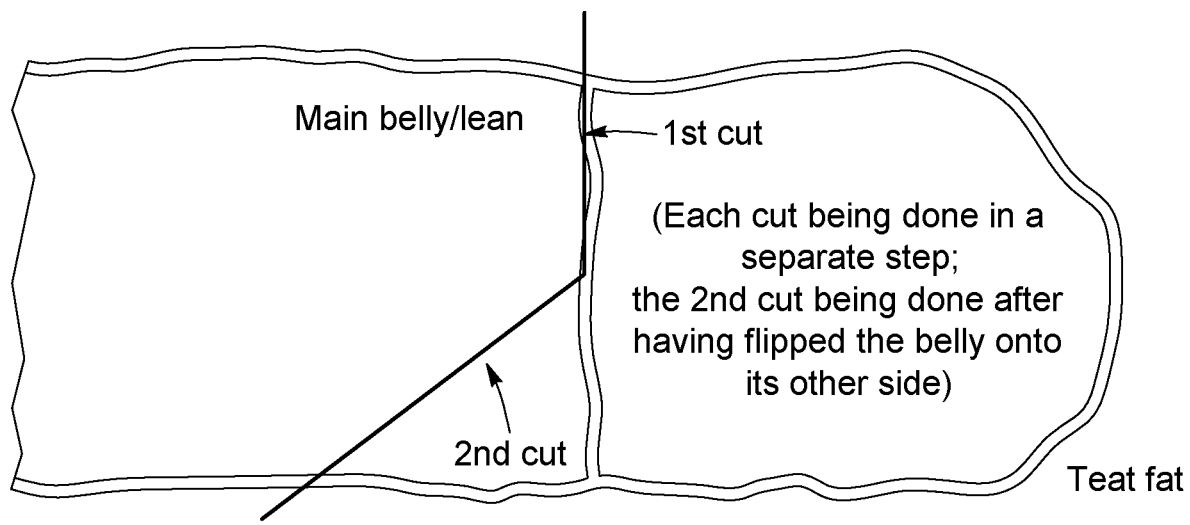
FIG. 4 is a schematic view of a cross-section of a portion of a pork belly, illustrating the result of cutting the pork belly along two cutting planes, separating the lean meat from the teat fat in two separate steps, the second cut being done after having flipped the pork belly, in accordance with the prior art.
Figure 5:
FIG. 5 represents an example of a pork belly after having been cut twice along the cutting planes shown in FIG. 4.
Figure 6:
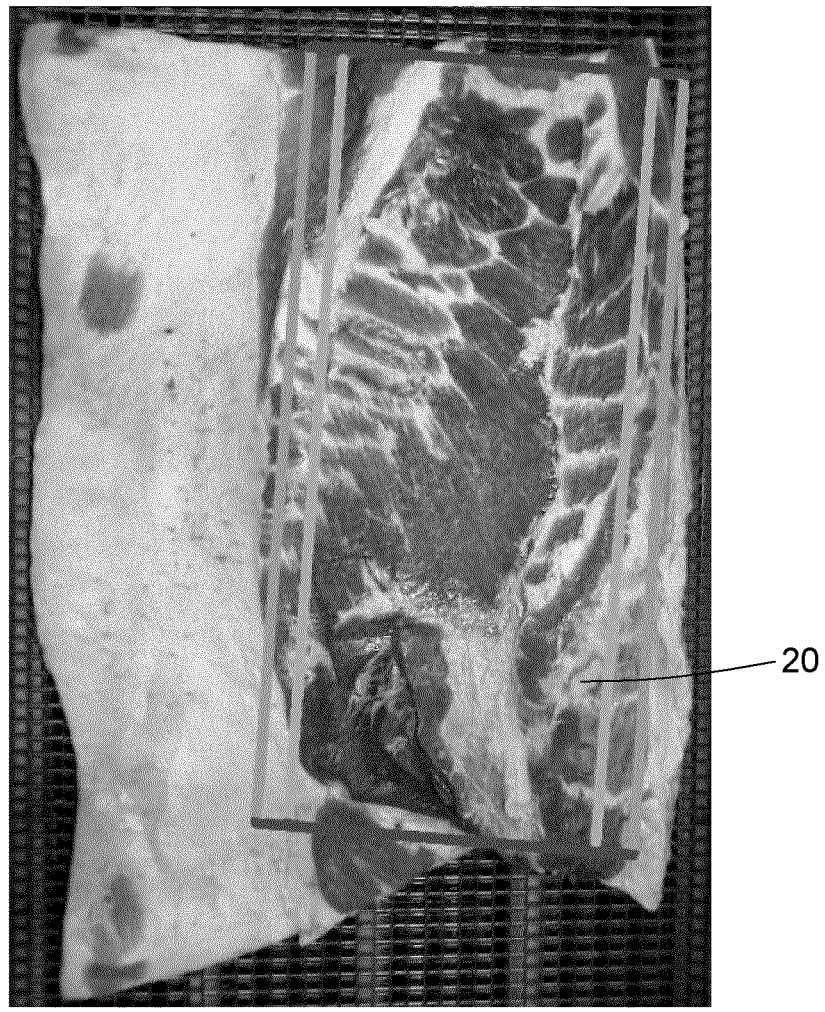
FIG. 6 is a top plan view of a pork belly with representations of cutting lines, the solid lines representing vertical cuts, the dotted lines representing the location of the edge contacting the conveyor belt.
Figure 7:
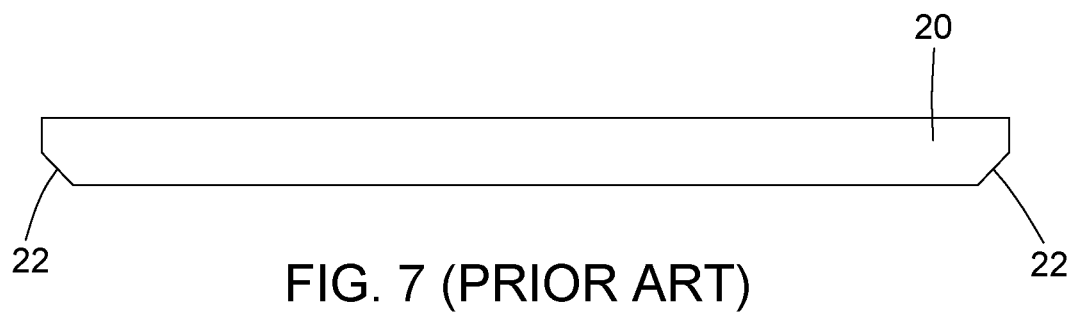
FIG. 7 is a schematic view of a cross-section of a pork belly which has been trimmed along two cutting planes as shown in FIG. 6.
Figure 8:
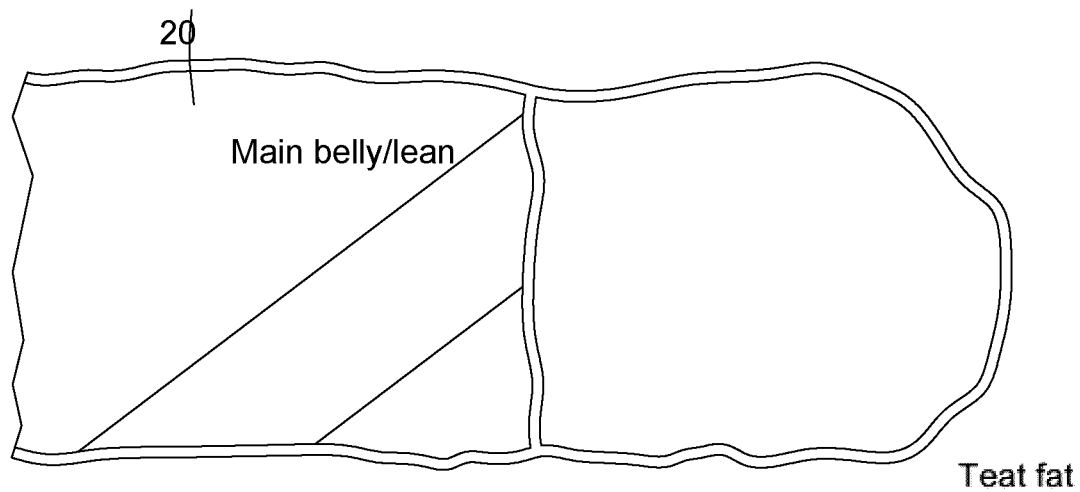
FIG. 8 is a schematic view of a cross-section of a portion of a pork belly, illustrating the difference in yield between the cut shown in FIG. 2 and the cuts shown in FIG. 4.

In the following description, the same numerical references refer to similar elements. Furthermore, for sake of simplicity and clarity, namely as to not unduly burden the figures with several reference numbers, only some figures have been provided with reference numbers, and components and features illustrated in other figures can be easily inferred therefrom. The embodiments, geometrical configurations, materials mentioned and/or dimensions (expressed in inches, and/or centimeters, for example) shown in the figures are preferred, for exemplification purposes only.

Moreover, although the cutting assembly described herein was primarily designed as an apparatus for trimming "pork bellies", it may be used for various types of applications, and with various other types of objects, and in other fields, as apparent to a person skilled in the art. For this reason, expressions such as "workpiece", "piece of meat", "pork belly", "meat cut", etc., used herein should not be taken as to limit the scope of the present disclosure and include all other kinds of objects and/or fields with which the cutting assembly could be used and may be useful, as apparent to a person skilled in the art.

Moreover, in the context of the present disclosure, the expressions "double-angled", "double-edged", "dual-edged", etc., as well as any other equivalent expressions and/or compound words thereof known in the art will be used interchangeably, as apparent to a person skilled in the art. This applies also for any other mutually equivalent expressions, such as, for example a) "cutting", "trimming", "carving", "cleaving", "sectioning", "shaving", "slashing", "removing", etc.; b) "cutter", "cutting tool", "cutting apparatus", "cutting device", "knife", "jet", etc., as well as for any other mutually equivalent expressions, pertaining to the aforementioned expressions and/or to any other structural and/or functional aspects described herein, as also apparent to a person skilled in the art. Also in the context of the present description, expressions such as "can", "may", "might", "will", "could", "should", "would", etc., may also be used interchangeably, whenever appropriate, as also apparent to a person skilled in the art.

Furthermore, in the context of the present description, it will be considered that all elongated objects have an implicit "longitudinal axis" or "centerline", such as the longitudinal axis of a "conveyor belt", for example, or the centerline of a piece of meat (e.g., pork belly). As such, there is a "transversal axis" being substantially "perpendicular" for each longitudinal axis, etc.). Furthermore, expressions such as "connected" and connectable, or "mounted" and "mountable", may be interchangeable, in that a system with corresponding components/assemblies meant to be assembled and fully operational for processing meat is also disclosed and/or meant herein.

Moreover, components of the cutting assembly, associated accessory(ies)/component(s)/part(s) thereof and/or steps of the method(s) described herein could be modified, simplified, altered, omitted, and/or interchanged, without departing from the scope of the present disclosure, depending on the particular applications which the cutting assembly is intended for, and the desired end results, as briefly exemplified herein and as also apparent to a person skilled in the art.

Additionally, although the preferred embodiments described below, and as illustrated in the accompanying drawings, may comprise various components, and although the preferred embodiments of the cutting assembly, accessory(ies), component(s), part(s) and/or associated method(s) (ex. operating, manufacturing, use, etc.) may consist of certain preferred steps and components as explained herein, not all of these steps and components are essential and thus should not be taken in their restrictive sense. It should be apparent that other suitable steps, components and cooperation thereinbetween, may be used for the present cutting assembly (as well as corresponding components thereof, etc.) and corresponding method(s), as will be briefly explained hereinafter and as can be easily inferred herefrom by a person skilled in the art.

Broadly described, the cutting assembly can be used as part of a processing system for trimming/cutting meat, such as pork bellies for example, and/or the like. More specifically, the cutting assembly can be operated to perform "double-angled" cuts along pork bellies in a single operation (for example, two cuts being done simultaneously, or at the very least, without having to flip the workpiece, etc.).

LIST OF NUMERICAL REFERENCES FOR SOME OF THE CORRESPONDING POSSIBLE COMPONENTS ILLUSTRATED IN THE ACCOMPANYING DRAWINGS

Figures 9A, 9B:
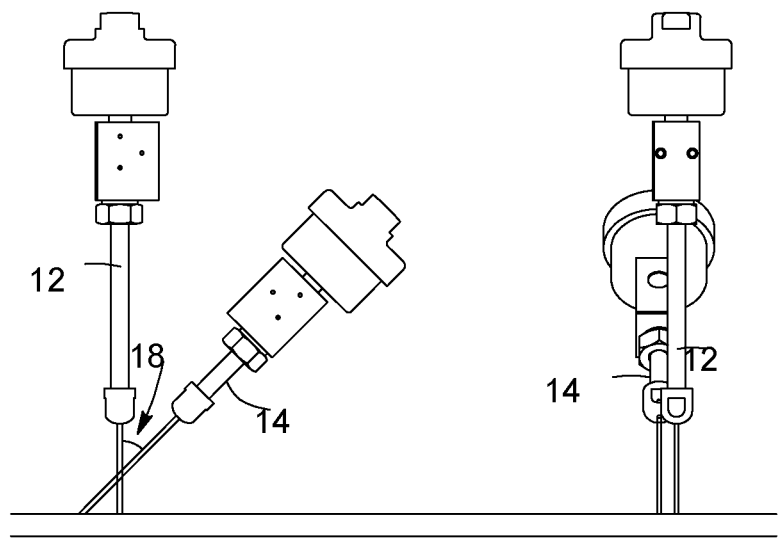
FIG. 9A is a front elevational view of cutting tools used to trim the pork belly in accordance with a possible embodiment of the present invention.
FIG. 9B is a side elevational view of the cutting tools shown in FIG. 9A.
Figure 10:
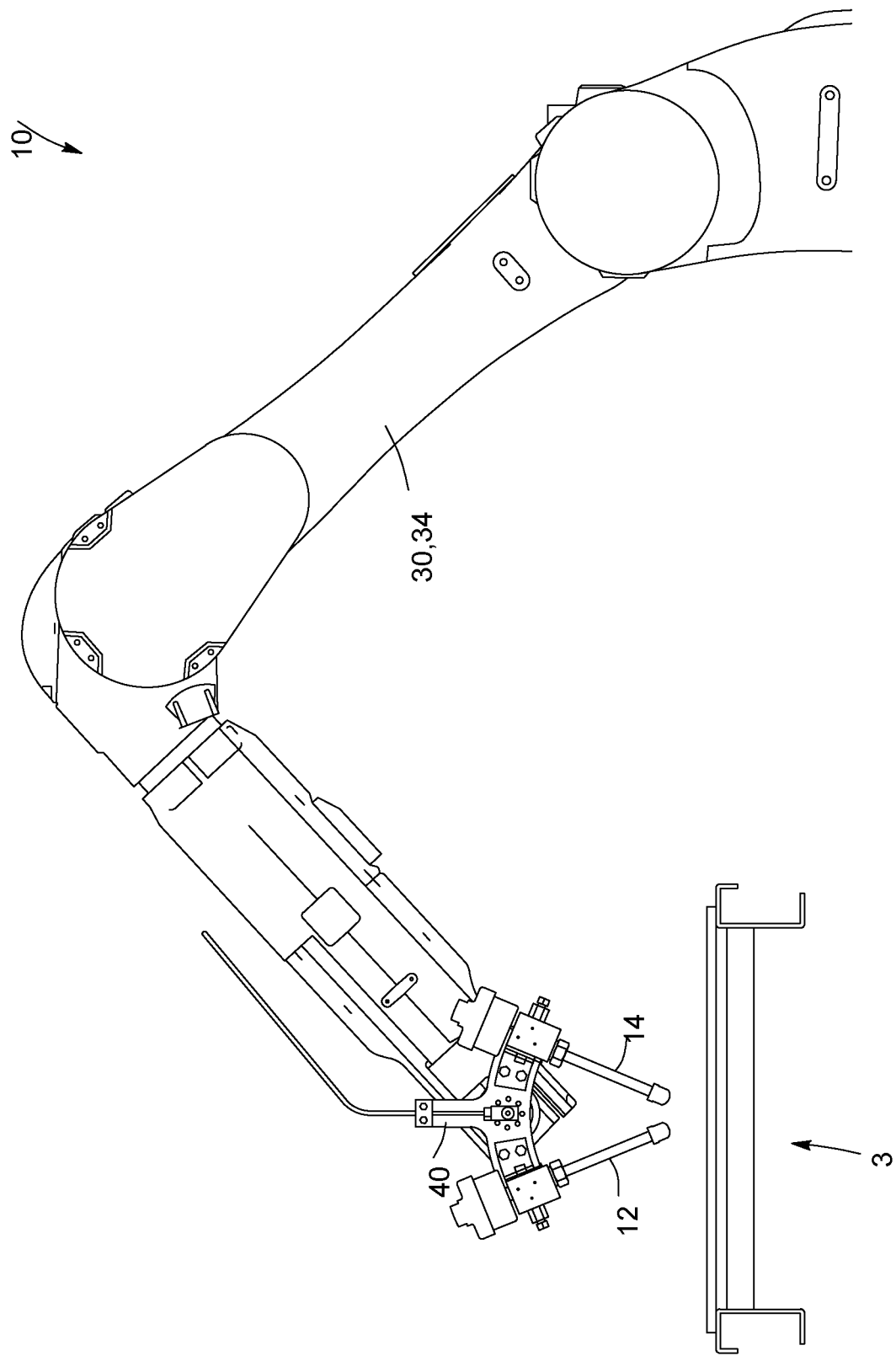
FIG. 10 is a front elevational view of a cutting assembly comprising cutting tools and a manipulator system in accordance with a possible embodiment of the present invention.

1. workpiece processing system
3. conveying assembly
5. guidance system
10. cutting assembly
12. first cutting tool
13. first cutting plane
13a. first axis
14. second cutting tool
15. second cutting plane
16. third cutting tool
17. third cutting plane
18. inner angle (ex. first inner angle)
19. second inner angle
20. workpiece/pork belly
22. bevel
30. manipulator system
32. elongated bridge
34. robotic arm
40. support frame Cutting Assembly Referring to FIGS. 9A to 10, a cutting assembly according to an embodiment is provided. The cutting assembly can include cutting tools adapted to cut the pork belly along cutting planes defined by the cutting tools. More specifically, the cutting assembly can include a first cutting tool adapted to cut the pork belly along a first cutting plane, and a second cutting tool adapted to cut the pork belly along a second cutting plane. The cutting tools are positioned in a manner such that the cutting planes define an inner angle therebetween. Therefore, the cutting assembly of this exemplary embodiment can cut the pork belly along the two different cutting planes in a single operation. In some embodiments, the inner angle can be between about 1 and 179 degrees, but is more specifically between about 30 and 60 degrees. The combination of the cuts will provide the desired edges on the end product. The cutting tools can include different cutting means, such as water jets, circular saws, reciprocating saws, cutting blades, ultrasonic knives, ultrasonic saws, lasers and/or any suitable cutting means and/or combination thereof. Furthermore, the cutters are slightly offset from each other to avoid contact, and/or deviation if high-pressure water jets are used.

As mentioned above, the cutting assembly can be operated to create multiple edges on a material to cut, such as the aforementioned pork bellies, in a single operation. In this embodiment, the first cutting plane can be substantially vertical for cutting the side of the pork bellies, while the second cutting plane can be angled relatively to the first cutting plane. As such, the second cutting tool can be adapted to create a bevel along the length of the pork belly. Creating the bevel at the same time as the side cut (i.e., vertical cut) provides the advantage of being more accurate, as compared to traditional operations where the bellies are flipped and/or transferred on different conveyors, which can alter product shape. Additionally, having multiple cutting tools mounted on a single cutting assembly advantageously requires less manipulator system, less parts, less working envelope space and smaller cycle time. As such, the cutting assembly can perform the cuts illustrated in FIGS. 4 to 7, in a single operation, without intermediary steps such as flipping the belly on the conveyor belt for example.

Referring more specifically to FIG. 10, the cutting assembly can include a manipulator system for displacing the cutting tools to cut the pork bellies in desired locations. The cutting assembly can further include a support frame on which the cutting tools can be operatively connected. In some embodiments, the support frame is rotatably connected to the manipulator system, at one end thereof, as illustrated in FIG. 10. It should thus be understood that the support frame can rotate about the end of the manipulator to change the orientation of the cutting planes, as will be explained further below. In this embodiment, the cutting tools include waterjets, and the manipulator system is a robotic manipulator adapted to axially displace the support frame, and thus the cutting tools over the piece of meat. However, it is appreciated that other mechanisms can be used as the manipulator system, such as a bridge extending over the conveyor similar to known x-y cutting tables for example. It should be understood that moving the cutting tools closer to the pork belly being cut effectively adjusts the size of the bevel.

In some embodiments, the cutting tools can be positioned at an angle of about 45 degrees relative to each other. However, when the cutting assembly is in a standby position, the cutters can be positioned at about 22.5 and about −22.5 degrees from the vertical normal of the conveyor belt, as shown in FIG. 10. In this embodiment, the angle between the cutting tools/cutting planes is fixed, but could alternatively be manually, and/or dynamically adjustable. In some embodiments, it is appreciated that one of the cutting tools can be independently movable with respect to the other cutting tool in order to adjust the angle therebetween, and thus adjust the angle of the bevel. Additionally, the cutting tools can be offset from each other on the support frame to avoid contact with one another. For example, if the waterjets contact each other, jets deviation would occur and alter the desired cuts (e.g. angle and/or location) being performed.

Figure 11:
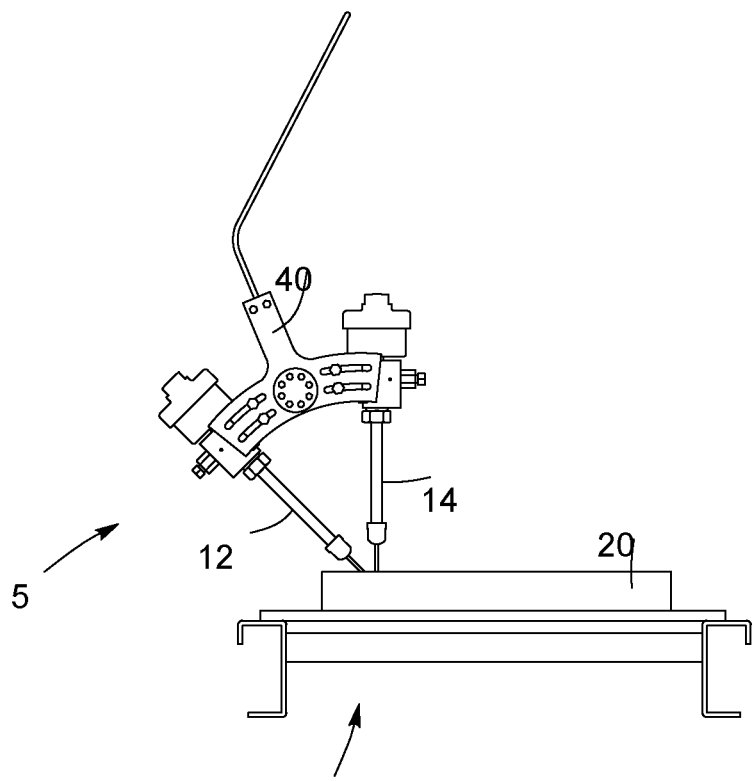
FIGS. 11 and 12 are front elevational views of cutting tools in different operating positions in accordance with a possible embodiment of the present invention.
Figure 12:
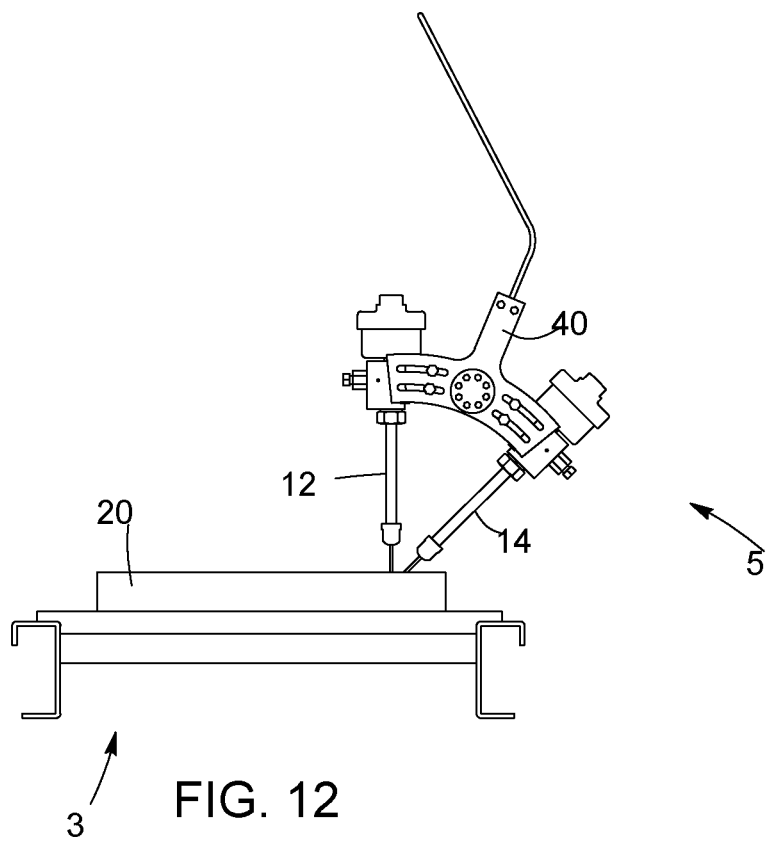

In some embodiments, the cutting assembly can trim one side of the belly with a double-angled cut and trim the opposite side of the following belly on the conveyor belt with minimal movement of the cutting tools. For example, the cutting assembly can be rotated by about 22.5 degrees, from the standby position, to cut one side (see FIG. 11), and can then rotate by about 45 degrees around one axis and move to the opposite side to trim the edge of a subsequent belly (see FIG. 12). In other words, with a slight rotation and translation, the cutting assembly can be operable to position the cutting tools in a way to provide generally constant angled cuts. This is important because high-pressure water lines are difficult to move and cannot accept large amplitude of movements without a complex design or sacrificing components lifetime, which can result in uneven angled cuts.

The cutting assembly can perform a straight end cut by either keeping both cutters activated or using only one as the cutting tools are moved across the conveyor. It should thus be understood that the cutting tools can be independently operated during operation of the cutting assembly. The cutting assembly can alternatively perform a double-angled cut on the side of the belly, rotate the cutters 90 degrees about the axis normal to the conveyor belt plane, and then perform a subsequent double-angled cut on at least one end of the belly. This operation is not doable without a robot manipulator and/or complex x-y motion with an additional rotary actuator and/or another appropriate manipulator system.

Figure 13:
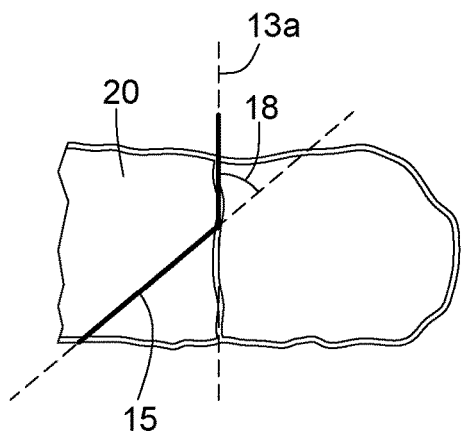
FIGS. 13A to 13C are schematic representations of different beveling thicknesses in accordance with possible embodiments of the present invention.
Figure 13B:
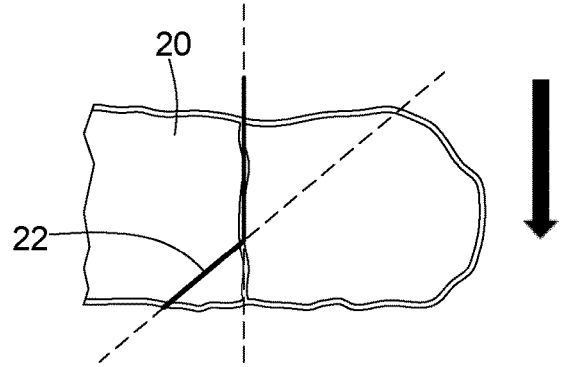
Figure 13C:
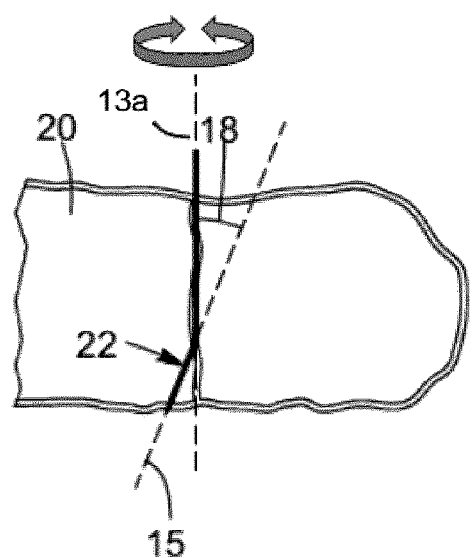

As mentioned above, the robot manipulator can modulate the depth of the beveled cut by adjusting the distance between the cutting assembly (i.e., the cutting tools) and the conveyor belt as illustrated in FIGS. 13A and 13B. As illustrated, moving the cutting tools closer to the conveying assembly can reduce the thickness of the beveled cut (i.e., adjust the size thereof). Alternatively, and as illustrated in FIG. 13C, rotating the cutting assembly about the axis defined by the first cutting tool (e.g., a first axis) or simply rotating the second cutting tool about the first axis of the first cutting tool can effectively reduce the thickness of the bevel and therefore reduce the amount of meat being removed by the beveled cut. It should be understood that the second cutting tool can rotate about the first axis in either direction in order to adjust the size/thickness of the bevel. In some embodiments, a single robot manipulator can cut the four sides of the belly with minimal movement of the cutting assembly and/or high-pressure water lines. The cuts are respectively done in a single operation which is more accurate, compared to performing sequential cuts using different cutting tools and/or flipping the belly in order to bevel edges.

Furthermore, the cutting tools can be independently activated using high-pressure valves which can provide flexibility to activate only one waterjet or both jets. For example, both waterjets can be simultaneously operated using one or more valves. Alternatively, one of the two cutting tools can be continuously operational while the other one can be activated/deactivated using the valve, or both cutting tools can be continuously operational with the cutting assembly having no valves. In some embodiments, the valves controlling the cutters can be remotely installed to reduce the weight of the cutting assembly and facilitate movement thereof. This type of control could be useful in order to create a vertical cut on one end of the belly and multiple edges on the sides, for example.

It should be apparent to a person skilled in the art that performing a double-angled trim can provide the following benefits:
- the double cut maximizes yield by leaving more meat on the final product while keeping end product dimensional attributes;
- the double cut improves quality of final product over a single bevel by providing thicker edges while still providing a bevel;
- the double cuts can be created with two or more independent cutters which are used in a single operation (i.e. simultaneously, in cooperation, etc.) to create a final beveled edge; and
- the double-angled edge is created in a single operation compared to traditional operation, which takes much less space.

Figure 14A:
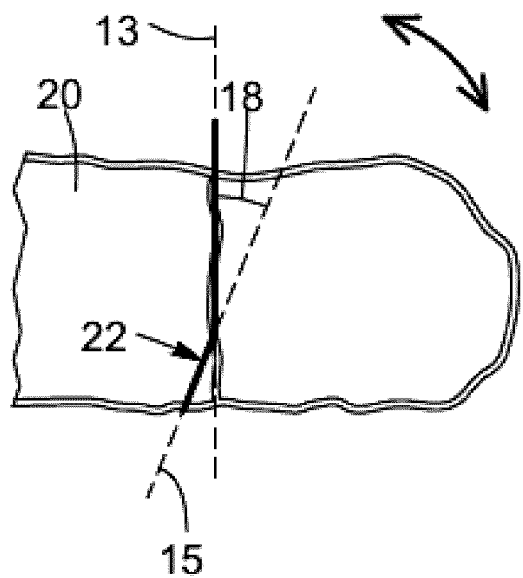
FIGS. 14A and 14B are schematic representations of different beveling angles in accordance with possible embodiments of the present invention.
Figure 14B:
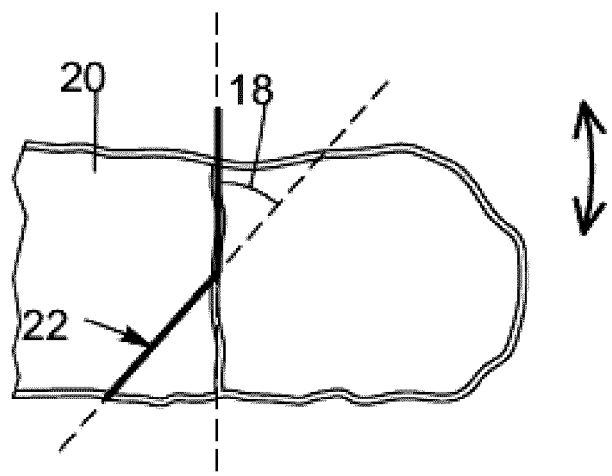

As described above, two cutting tools or more can be used on a single manipulator system, such as the robot manipulator illustrated in FIG. 10, which can provide savings in motion hardware, reduced working envelope and cycle time. This also means less components to maintain and less initial investment. If using a robotic manipulator and/or complex manipulator system, the edge of the product can be adjusted, at rest and/or dynamically, according to any angles. Furthermore, the beveling angle can be modulated if at least one of the cutters is independently movable with respect to the other(s), as illustrated in the exemplary embodiments of FIGS. 14A and 14B. It is appreciated that the beveling angle can be modulated/adjusted by rotating the cutting assembly about the axis defined by the vertical cutter. The rotation results in a combined angle defining a different beveling angle. It is thus appreciated that the robot manipulator can allow the cutting assembly to perform double-angled cuts, single bevels and/or vertical cuts along one or several of the four sides of the pork belly.

In various embodiments, the cutting tools can be adjusted/moved in order to adjust the angle therebetween via one or more mechanisms. In a possible embodiment, at least one cutting tool can be movable independently from the other. As such, the cutting tools can be moved vertically or pivoted about one another to adjust the depth of the cuts, as illustrated in FIGS. 13A to 13C, or rotated with respect to each other, effectively adjusting the angle therebetween, as described above, and as illustrated in FIGS. 14A and 14B. In another possible embodiment, both cutting tools can be centrally connected and driven, allowing movement for each cutting tool (axially and radially) to adjust the angle of the cuts.

In a possible embodiment, the manipulator system (i.e. robot manipulator) can be provided with instructions/information via a guidance system. The guidance system can be adapted to scan the workpiece (i.e., the pork belly) in order to determine the location of said workpiece upon the conveying assembly (i.e. conveyor belt), and acquire information such as geometry, topology, and much more. Furthermore, additional measurements, such as belly fat thickness, can be obtained by previous measuring system(s) and/or additional vision system(s) to dynamically adjust the bevels. Internal measurements acquired by an x-ray system, or other similar machine/system, could also be used for example. In this possible embodiment, the guidance system can transfer information to the cutting assembly, more particularly to the robot manipulator, to position the cutting tools appropriately to cut and/or trim the pork belly.

Figure 15:
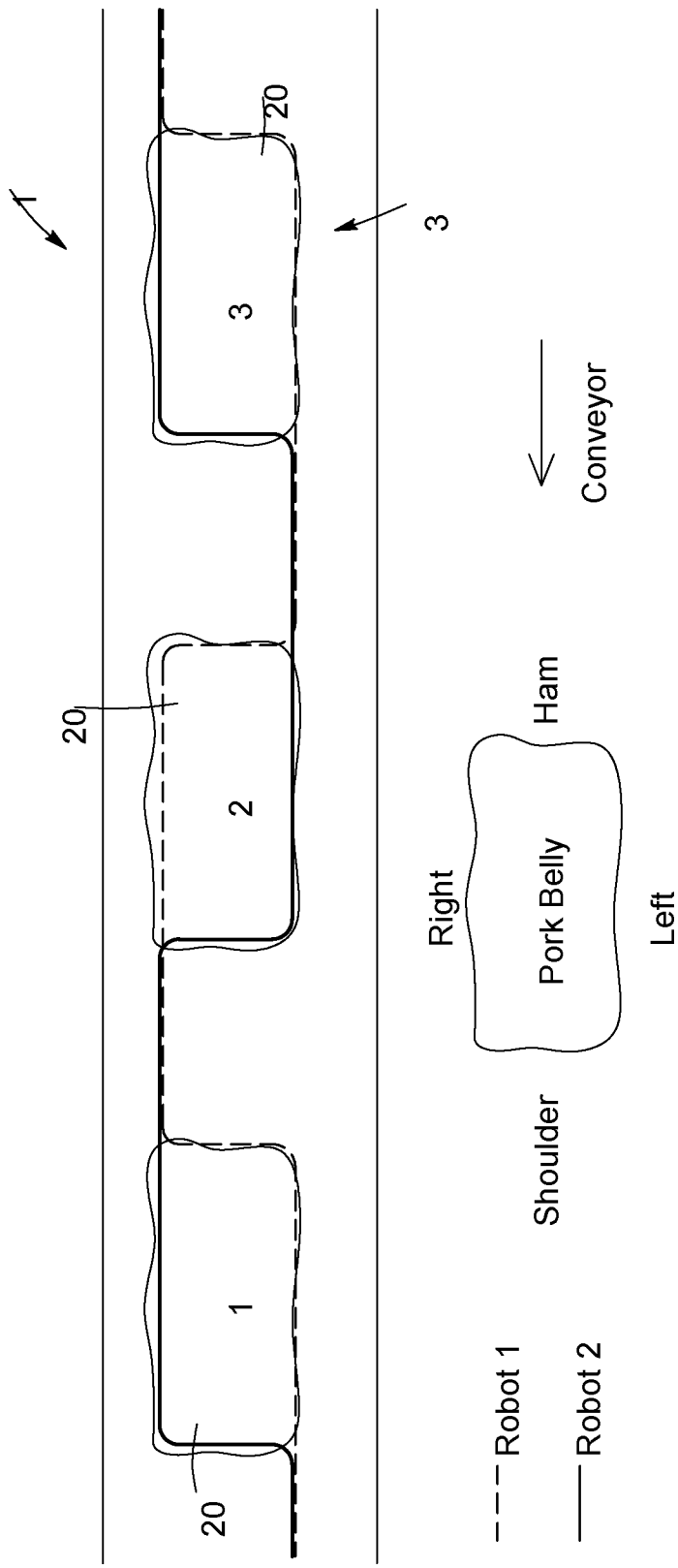
FIG. 15 is a representation of a pork belly cutting system with multiple pork bellies on a conveyor belt and the cutting paths of two cutting assemblies as shown in FIG. 10, in accordance with a possible embodiment of the present invention.

In the exemplary embodiment of FIG. 15, the processing system includes two cutting assemblies, thus two robot manipulators equipped with double waterjet assemblies. Each cutting assembly can have the ability to cut the four sides if the other one of the cutting assemblies malfunctions or simply cannot operate.

The operation of the two cutting assemblies can be as follows (illustrated in FIG. 15):
- Robot 1 cuts the left side of the first belly with either one waterjet or both waterjets activated (tool orientation shown in FIG. 12);
- Robot 1 cuts ham end of the first belly with either one waterjet or both waterjets, while moving to the right side of the conveyor belt;
- Robot 2 cuts shoulder end of the first belly with either one waterjet or both waterjets, while moving to the right side of the conveyor belt; and
- Robot 2 cuts the right side of the first belly with either one waterjet or both waterjets activated (tool orientation shown in FIG. 11) while Robot 1 begins the cut of the right side of the second belly.

In this embodiment, the conveying assembly can be in constant motion, therefore eliminating the need to stop, and/or go backwards, and allow the cutting assembly time to perform any type of cuts, such as a single bevel, vertical, double-angled, and/or not performing a cut on more than one side of the workpiece, depending on product specifications.

Figure 16:
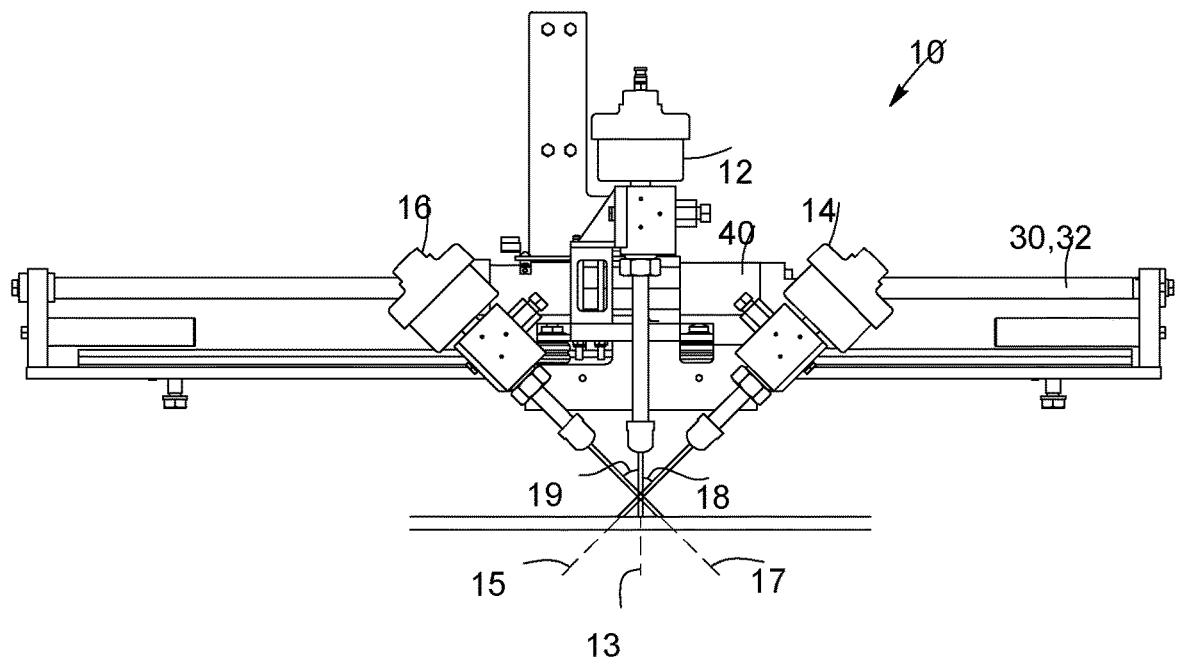
FIG. 16 is a front elevational view of a cutting assembly comprising three cutting tools attached to a manipulator system in accordance with a possible embodiment of the present invention.

Now referring to FIG. 16, the cutting assembly can comprise three cutters mounted on a carriage (i.e., support frame) for which there are at least two controlling valves. An elongated bridge, defining a linear axis, is used as the main manipulator system, the carriage being adapted to move along said axis. Alternatively, an x-y manipulator system (e.g., an x-y cutting table, etc.) could also be used. In this embodiment, a first cutting tool can be positioned with a first angle, for example, about 45 degrees. A second cutting tool can be positioned substantially vertical so as to perform the straight cut, and a third cutting tool can be positioned with an angle substantially mirrored from the first angle, for example about −45 degrees from the vertical cutting tool. The present embodiment can trim the side of the pork belly to obtain a single cut, such as a single bevel and/or a vertical cut, using either one of the three cutters, and/or obtain a multiple-edged cut using at least two cutters such as a double-beveled cut or a three-edged side using all three cutters. In this embodiment, the cutting assembly can perform a multiple-edged cut on the left side of the belly or on the right side, without having to rotate the assembly, thus being versatile and flexible. Additionally, the present embodiment can be adapted to trim with a first beveling angle on the left side of the workpiece and a second beveling angle for the right side of the workpiece. As such, this embodiment can be more compact compared to a system having individual and/or spare cutting tools. Alternatively, the angled cutting tools can be movable axially and/or radially, as described above, relatively to the other cutters and/or the conveyor, which can enable dynamic adjustment of the angle or depth of the bevel. It should be appreciated that the cutting assembly including three cutting tools can alternatively be used with the robotic manipulator described above.

Figure 17:
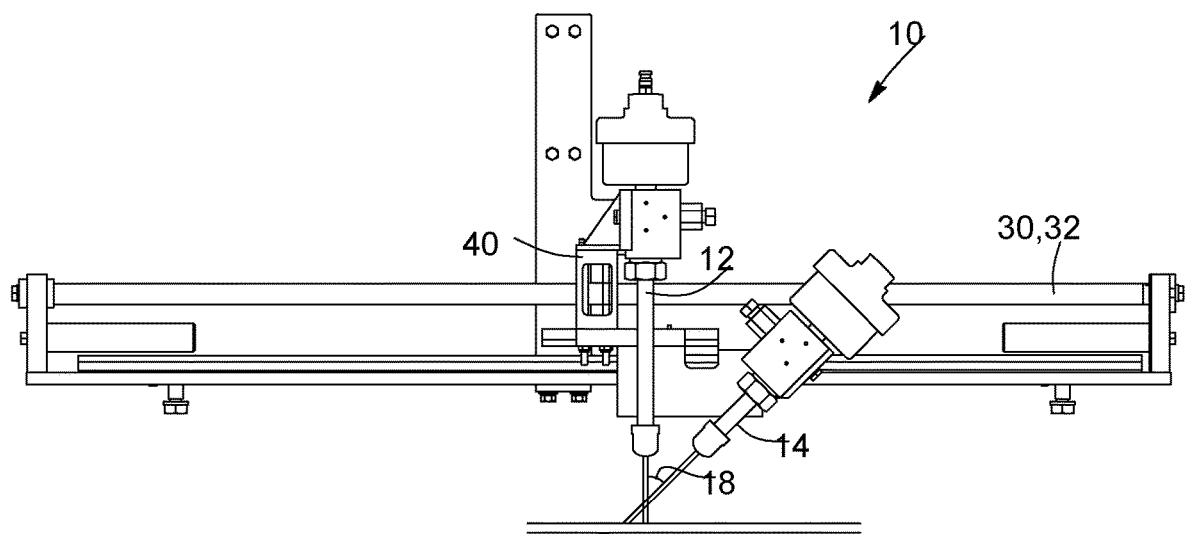
FIG. 17 is a front elevational view of a cutting assembly comprising two cutting tools attached to a manipulator system in accordance with a possible embodiment of the present invention.

In another embodiment, illustrated in FIG. 17, the carriage can have only two cutting tools mounted thereon. As such, this embodiment of the cutting assembly can perform a single vertical cut, a single beveled cut as well as a double-angled cut on one side of the pork bellies only. Consequently, the processing system would need to be equipped with two or more cutting assemblies to fulfill requirements of trimming multiple sides of the pork bellies.

In one embodiment, the processing system can include three cutting assemblies provided with two or three cutting tools, for example:
- a first cutting assembly provided with a vertical cutter and a second cutter angled by about 45 degrees from the vertical cutter;
- a second cutting assembly provided with a vertical cutter and a second cutter angled by about −45 degrees from the vertical cutter; and
- a third cutting assembly provided with the three cutters, as illustrated in FIG. 16 and as described above.

In this exemplary embodiment, the first and second cutting assemblies are adapted to trim the sides of the pork bellies in a manner similar to the method described hereinabove and illustrated in FIG. 15. The third cutting assembly can therefore be provided as a spare cutting assembly, ready to be used in case of an emergency, such as a problem with any of the other cutting assemblies and/or individual cutting tools.

Figure 18:
FIG. 18 is a picture of pork-side ribs.
Figure 19:
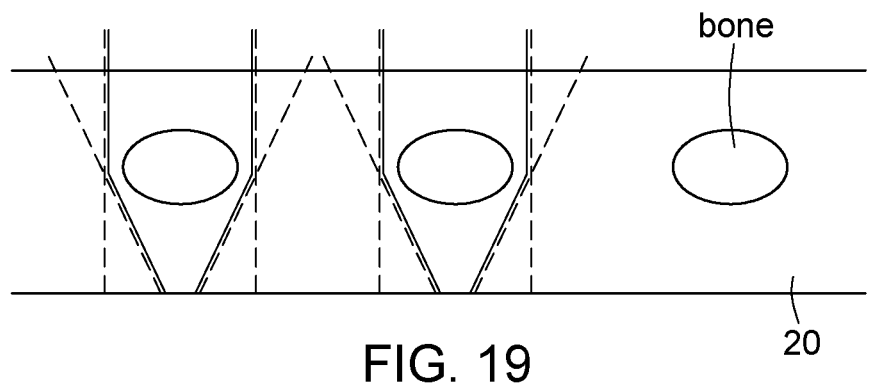
FIG. 19 is a schematic representation of cutting lines for trimming pork side ribs, in accordance with a possible embodiment of the present invention.
Figure 20:
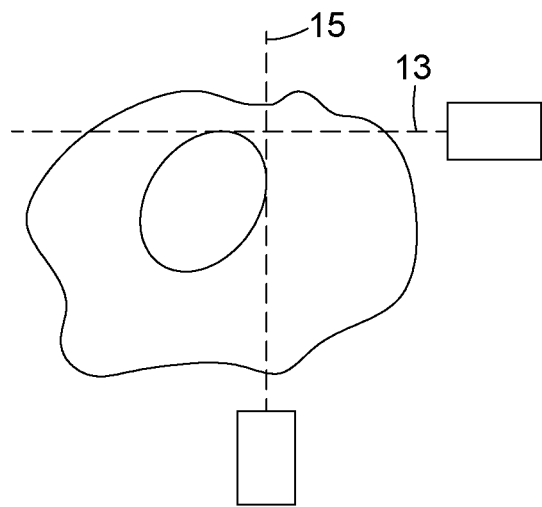
FIG. 20 is a schematic representation of cutting lines for trimming a larger piece of meat provided with a single bone.
Figure 21A:
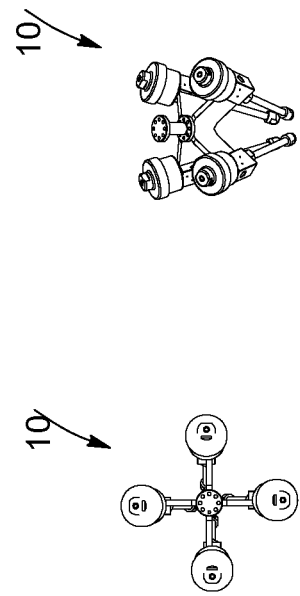
FIG. 21A is a top elevational view of a cutting assembly having a robotic arm as a manipulator system, and comprising four cutters, in accordance with a possible embodiment of the present invention.
Figure 21C:
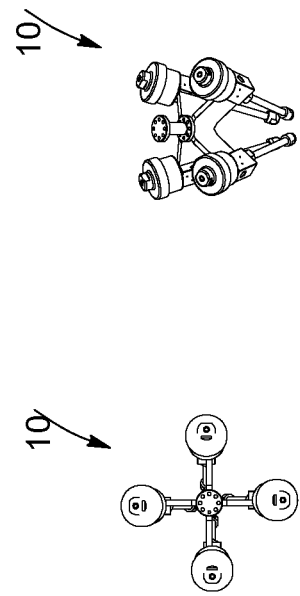
FIG. 21C is a perspective view of the cutting assembly shown in FIG. 21A.
Figure 21B:
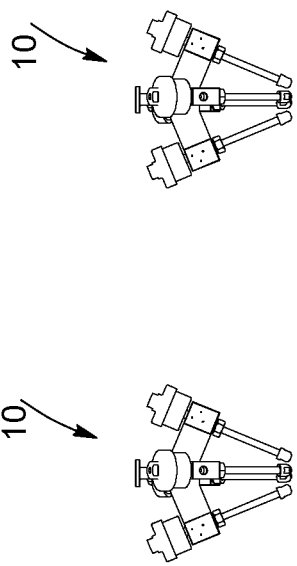
FIG. 21B is a front elevational view of the cutting assembly shown in FIG. 21A.
Figure 21D:
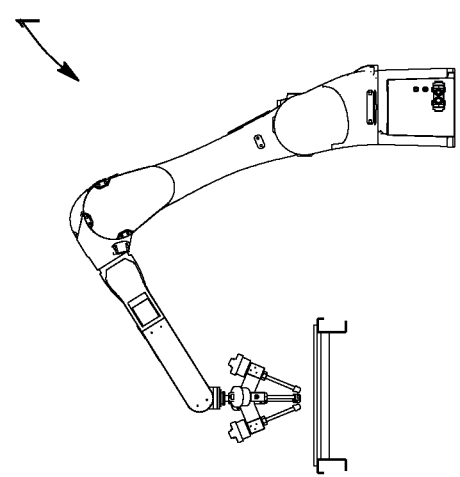
FIG. 21D is a side elevational view of the cutting assembly shown in FIG. 21A.
Figure 22A:
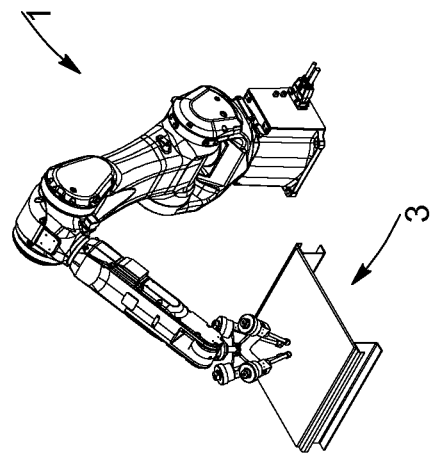
FIG. 22A is a top elevational view of four cutters mounted on a support frame, in accordance with a possible embodiment of the present invention.
Figure 22C:
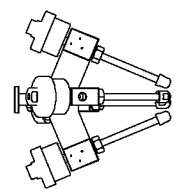
FIG. 22C is a perspective view of the cutting assembly shown in FIG. 22A.
Figure 22B:
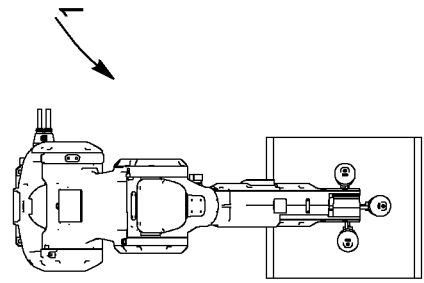
FIG. 22B is a front elevational view of the cutting assembly shown in FIG. 22A.
Figure 22D:
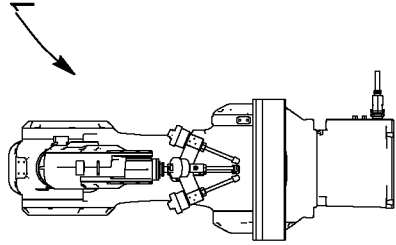
FIG. 22D is a side elevational view of the cutting assembly shown in FIG. 22A.
Figure 24A:
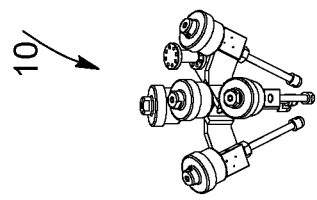
FIG. 24A is a top elevational view of five cutters mounted on a support frame, in accordance with a possible embodiment of the present invention.
Figure 24C:
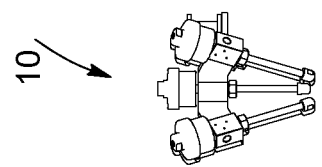
FIG. 24C is a perspective view of the cutting assembly shown in FIG. 24A.
Figure 24B:
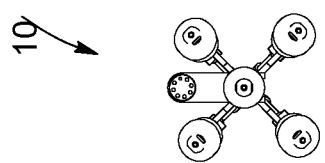
FIG. 24B is a front elevational view of the cutting assembly shown in FIG. 24A.
Figure 24D:
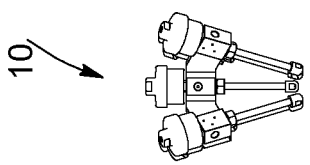
FIG. 24D is a side elevational view of the cutting assembly shown in FIG. 24A.
Figure 23C:
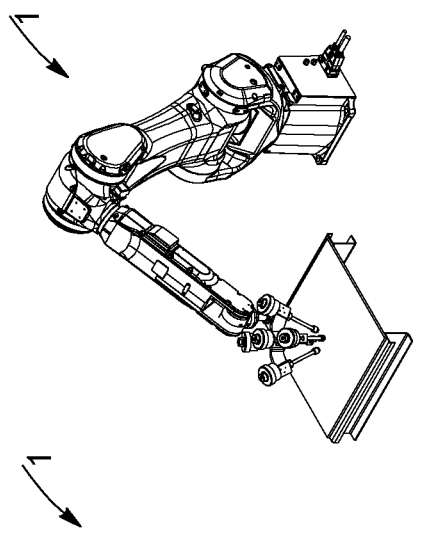
FIG. 23C is a perspective view of the cutting assembly shown in FIG. 23A.
Figure 23D:
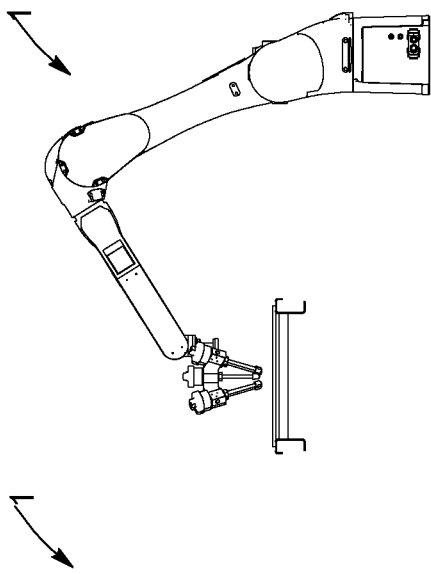
FIG. 23D is a side elevational view of the cutting assembly shown in FIG. 23A.
Figure 23A:
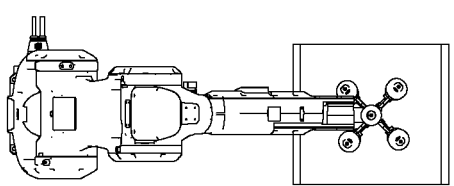
FIG. 23A is a top elevational view of a cutting assembly having a robotic arm as a manipulator system, and comprising five cutters, in accordance with a possible embodiment of the present invention.
Figure 23B:
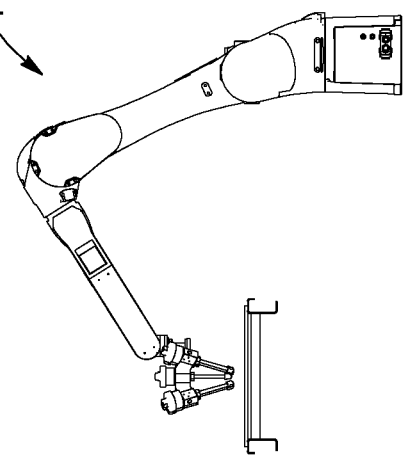
FIG. 23B is a front elevational view of the cutting assembly shown in FIG. 23A.
Figure 26C:
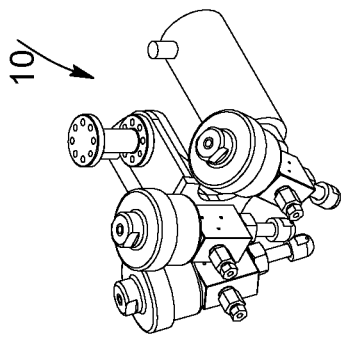
FIG. 26C is a perspective view of the cutting assembly shown in FIG. 26A.
Figure 26D:
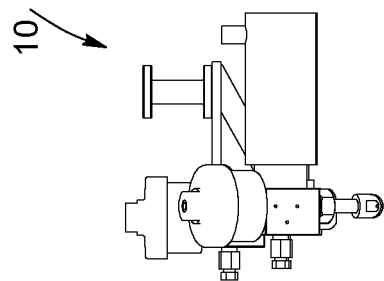
FIG. 26D is a side elevational view of the cutting assembly shown in FIG. 26A.
Figure 26A:
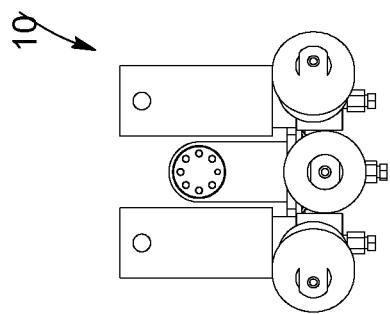
FIG. 26A is a top elevational view of three cutters mounted on a support frame, in accordance with a possible embodiment of the present invention.
Figure 26B:
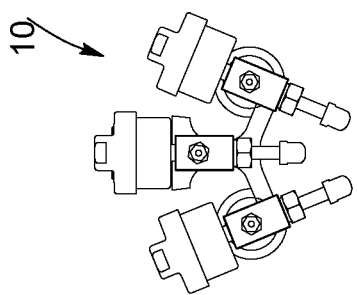
FIG. 26B is a front elevational view of the cutting assembly shown in FIG. 26A.
Figure 25C:
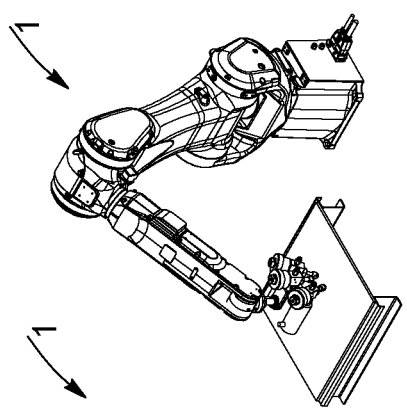
FIG. 25C is a perspective view of the cutting assembly shown in FIG. 25A.
Figure 25A:
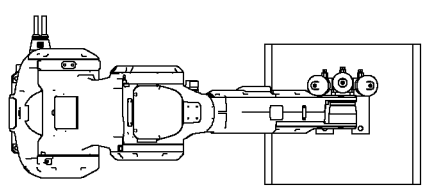
FIG. 25A is a top elevational view of a cutting assembly having a robotic arm as a manipulator system, and comprising three cutters mounted on a support frame, the support frame being rotatable about a vertical axis with respect to the robotic arm, in accordance with a possible embodiment of the present invention.
Figure 25D:
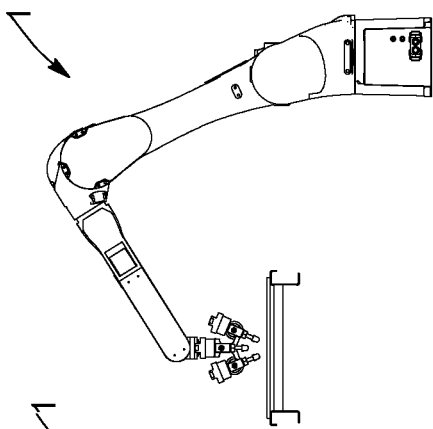
FIG. 25D is a side elevational view of the cutting assembly shown in FIG. 25A.
Figure 25B:
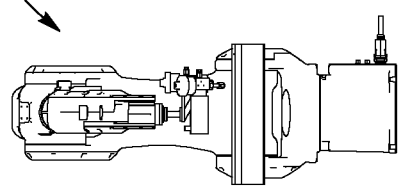
FIG. 25B is a front elevational view of the cutting assembly shown in FIG. 25A.
Figure 27C:
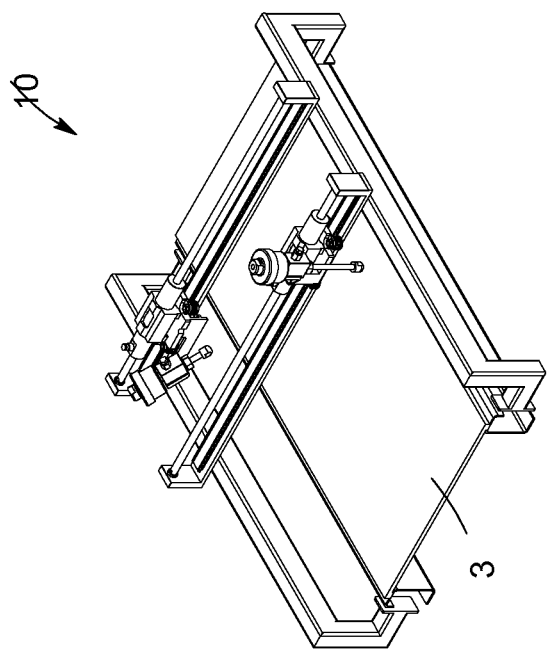
FIG. 27C is a perspective view of the cutting assembly shown in FIG. 27A.
Figure 27D:
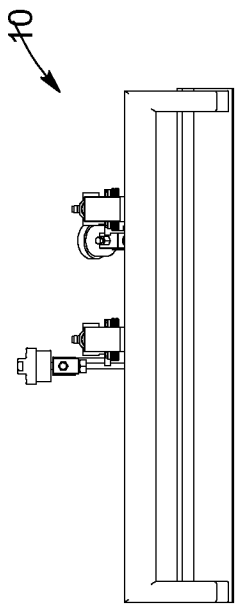
FIG. 27D is a side elevational view of the cutting assembly shown in FIG. 27A.
Figure 27A:
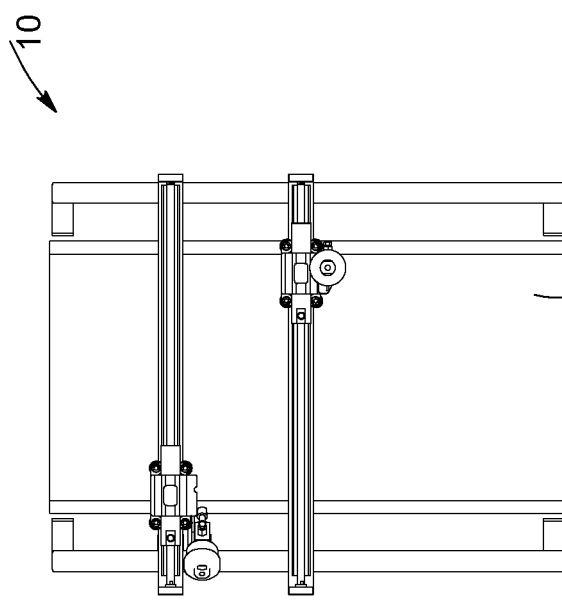
FIG. 27A is a top elevational view of a cutting assembly comprising two cutters mounted on a respective axis, adapted to cut a workpiece sequentially, along two different angles, in accordance with a possible embodiment of the present invention.
Figure 27B:
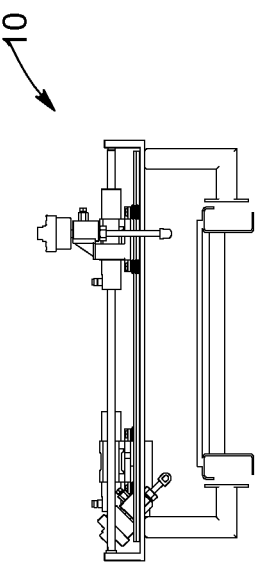
FIG. 27B is a front elevational view of the cutting assembly shown in FIG. 27A.
Figure 28C:
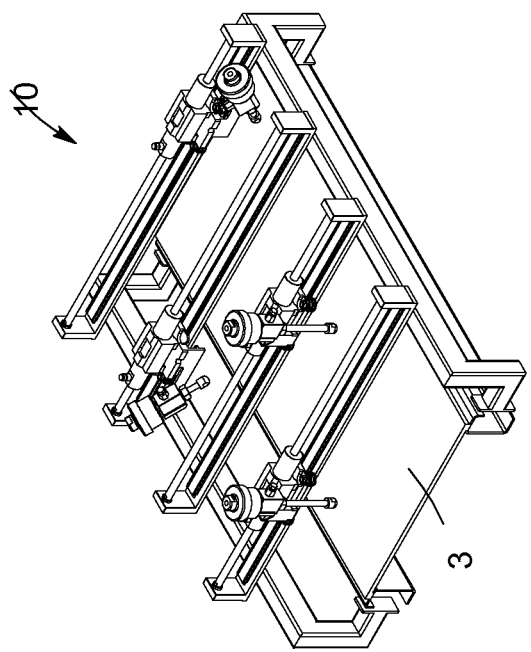
FIG. 28C is a perspective view of the cutting assembly shown in FIG. 28A.
Figure 28D:
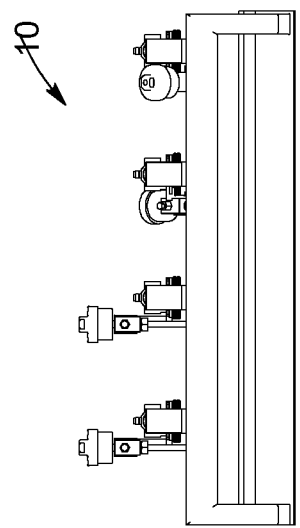
FIG. 28D is a side elevational view of the cutting assembly shown in FIG. 28A.
Figure 28A:
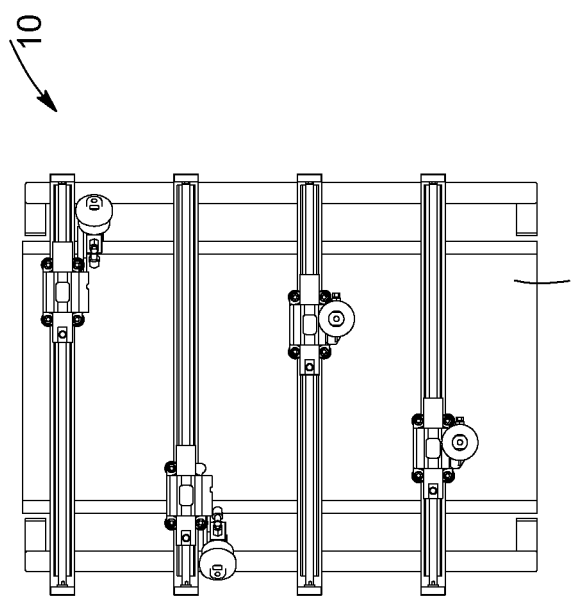
FIG. 28A is a top elevational view of a cutting assembly comprising four cutters mounted on a respective axis, adapted to trim a respective side of a workpiece in a sequential manner, in accordance with a possible embodiment of the present invention.
Figure 28B:
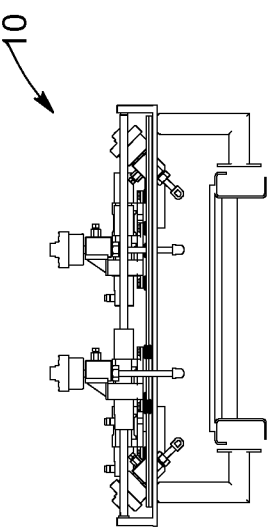
FIG. 28B is a front elevational view of the cutting assembly shown in FIG. 28A.

Now referring to FIGS. 18 to 20, the cutting assembly can be operated for bone trimming applications. A first example is an application for which meat needs to be trimmed from the bones of a meat product, such as pork side ribs (see FIG. 18) or beef plate bones. In this embodiment, the meat product can be conveyed on a stainless belt with bones lying on a layer of meat. Bones can be mostly parallel to the belt and the cutting assembly can include at least two cutters (i.e., one vertical cutter and one angled) to trim along the length of the bone (vertical cutting tool) and slightly under the bones (angled cutting tool), as illustrated in the example of FIG. 19. While the dotted lines represent cut lines of a cutting assembly provided with double waterjets, the solid lines illustrate the final cuts around the bones which would leave less meat on and/or around them. A cutting assembly consisting of two waterjets can make multiple passes to trim around the bones. Alternatively, a three-waterjets cutting assembly, such as the one described hereinabove, can trim the top with an angled cut, the side of the bone with a straight/vertical cut and the bottom with another angled cut.

A second example consists of trimming meat around at least one bone, such as a pork ham for example. The waterjets of the cutting assembly (or any other suitable cutters) can be provided with a larger angle which would reduce meat left on the bone. This exemplary application is illustrated in FIG. 20.

The above examples can provide the following benefits:
- maximizing yields by removing more from a bone-in product—the same operation done manually would be very labor and time consuming—historically, this operation is done with a single vertical cut only;
- a single cutting assembly with multiple cutters reduces cycle time and machine floor space.

Furthermore, in alternate embodiments, the cutting assembly can include three, four or five cutters operated via the robotic manipulator as illustrated in FIGS. 21A to 26D. For example, the cutting assembly illustrated in FIGS. 21A to 22D includes four cutting tools respectively adapted to perform an angled cut on one of the four sides of the pork belly with less assembly rotation, and thus minimizes movement of said assembly. More specifically, this embodiment can employ four valves which are configured as two pairs of opposed cutting tools. The assembly can be used in two ways: the first technique is to use a pair of opposed cutting tools to cut any sides of the bellies by displacing the tool in order to create the needed cuts such as double bevels, single bevel or vertical cuts. The remaining pair of opposed cutting tools can be redundant or spare opposed cutting tools that can be operated when needed. The second technique would consist at using a pair of opposed cutting tools for trimming the sides and the remaining pair for cutting the ends of the workpiece, reducing the rotation required during operation.

The embodiments of FIGS. 23A to 24D illustrates an assembly similar to the one of FIGS. 21A to 22D, with the addition of a fifth cutting tool positioned in the center of the others, and can be adapted to perform vertical cuts on the pieces of meat. This additional cutting tool can be configured to eliminate the need to tilt the cutting assembly when vertical cuts or double-edged cuts are needed. This embodiment is less demanding on the high-pressure water lines as well as for the manipulator system (i.e., the robot manipulator).

As for the embodiments of FIGS. 25A to 26D, this embodiment employs three cutting tools: a first vertical cutting tool adapted to cut the vertical or mostly vertical edges on the workpiece and two opposed angled cutting tools adapted to trim one and/or the other side of the workpiece with reduced movement of the cutting tools. Moreover, each angled cutting tool can be dynamically displaced using an electrical servo-motor, pneumatic actuator or any other type of manipulator system. This is particularly useful for dynamically controlling the bevel angles depending of the workpiece cutting specifications which could vary from side to side or dynamically adjusted along the cutting path In the embodiments described herein, the angle of the cutting tools can be adjusted with respect to the support frame, said adjustments can be done manually or dynamically during operation of the cutters. Furthermore, the aforementioned cutting assemblies can include any suitable number of valves in order to operate the cutting tools, or in some cases can alternatively have no valves.

Referring back to FIGS. 16 and 17, the angle between the cutting tools can be adjusted with the use of a rotating valve. In a similar fashion as the robotic manipulator, the elongated bridge can also be adapted to move the cutting tools closer to the pork belly to adjust the depth of the bevel. Additionally, the beveling angle can be adjusted by adjusting the angle of the cutting tools about the support frame, and at least one cutting tool can be adapted to move transversally over the conveyor belt to adjust the position of the cuts being made. In this embodiment, it is appreciated that the above described adjustments can be done dynamically and/or manually.

In some embodiments, the cutting assembly can include one, two or three valves to operate one or more of the waterjet cutters but can alternatively include no valves. Each inner angle of the cutting tools can be dynamically adjusted along with the height thereof upon the support frame. It should be understood that the cutting assemblies having two, three or more cutting tools can be adapted for use with an x-y cutting table, or displaced by other types of manipulator system.

In alternate embodiments, as illustrated in FIGS. 27A to 27D, the cutting assembly can include two independent elongated bridges, respectively defining a linear axis. In this embodiment, the first bridge can include an angled cutting tool adapted to create a single beveled cut and/or contribute to a double-edged cut. The second bridge can include a vertical cutting tool adapted to cut the generally vertical edges on the side of the workpiece. The cutting tools can be used one after the other on the same workpiece travelling along a conveyor belt. When properly synchronized with the conveyor belt, the cutting tools can produce a combined double-edged cut without flipping and/or moving the workpiece.

Now referring to FIGS. 28A to 28D, the cutting assembly can illustratively include four independent elongated bridges respectively provided with a cutting tool. The first two cutting tools can be angled cutters adapted to create single beveled cuts and/or contribute to double-edged cuts on their respective side of the workpiece. It is thus appreciated that the two following cutting tools can be mostly vertical and adapted to cut the generally vertical edges on the side of the workpiece(s). The cutting tools can all be used one after the other on the same workpiece travelling along a conveyor belt. It should be understood that, when properly synchronized with the conveyor belt, the cutting tools can produce combined double-edged cuts, single bevels or vertical cuts without flipping and/or moving the workpiece.

The cutting assembly can be adapted to be used within a processing system configured to process pieces of meat such as pork bellies. The processing system can include one or more cutting tools, one or more robotic manipulators, one or more elongated bridges, one or more x-y cutting tables and/or any other similar cutting assemblies, manipulator system or combination thereof. The aforementioned individual cutting tools can be adapted to perform vertical cuts, single bevels and/or a combination thereof, such as the embodiments illustrated in FIGS. 27A to 28D.

Figure 29:
FIG. 29 is a schematic view of a cross-section of a pork belly which has been trimmed along two cutting planes, in accordance with a possible embodiment of the present invention.
Figure 30:
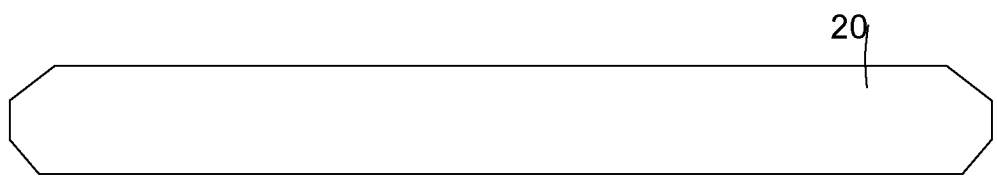
FIG. 30 is a schematic view of a cross-section of a pork belly which has been trimmed along three cutting planes, in accordance with a possible embodiment of the present invention.

It should be understood that the cutting assemblies, or individual cutting tools, can operate sequentially, thus performing separate cutting operations, such as in the embodiments illustrated in FIGS. 27A to 28D. As such, the expression "in a single operation" can refer to a plurality of cuts, done sequentially, without having to flip the pork belly on the conveyor belt or elsewhere, for example. Furthermore, although preferred embodiments have been briefly described herein and illustrated in the accompanying drawings, it is to be understood that the cutting assembly is not limited to these embodiments and that various changes and modifications could be made without departing from the scope of the present disclosure, as apparent to a person skilled in the art. For example, the cutting tools can be adapted to perform the beveled cut above the vertical cut, as illustrated in FIG. 29, or perform a double-beveled cut, as illustrated in FIG. 30.

As may now better be appreciated, the above-described cutting assembly, and corresponding components, provide substantial improvements over known prior art in that, by virtue of its design and components, as explained herein, and the particular configuration of the cutting assembly and/or component(s)/accessory(ies) thereof according to the present system, it enables to carry out trimming operations of a workpiece along different cutting planes in a single operation, and thus in a more efficient, more precise, more accurate, more reliable, more adjustable, more versatile, more adaptable, more impactful, more strategic, and/or more desirable manner (e.g., depending on the circumstances, and the intended results, etc.), compared to what is possible with respect to other known conventional cutting assemblies/tools and/or methods.

Indeed, as previously explained, and depending on the different possible embodiments, the present system advantageously enables to: a) create a double-angled-edge in a single operation; b) reduce operation and cycle times; c) increase accuracy of cuts and maximize yield, thus increasing quality of end product; d) reduce equipment, working envelop space and maintenance costs; e) reduce initial investment, f) etc.

Of course, and as can be readily understood by a person skilled in the art, the cutting assembly should not be limited by the possible embodiments set forth in the examples, but should be given the broadest interpretation consistent with the description as a whole.

The invention claimed is:

1. A cutting assembly for cutting a workpiece, the cutting assembly comprising:
a manipulator system;
a support frame rotatably connected to the manipulator system;
a first cutting tool operatively connected to the support frame and adapted to cut the workpiece along a first cutting plane;
a second cutting tool operatively connected to the support frame and adapted to cut the workpiece along a second cutting plane different than the first cutting plane, the second cutting plane intersecting the first cutting plane; and
the first and second cutting planes defining an inner angle therebetween, the cutting assembly being adapted to cut the workpiece along the first and second cutting planes in a single operation.

2. The cutting assembly according to claim 1, wherein the manipulator system is adapted to displace the support frame in order to position the cutting tools over the workpiece in a desired location to enable cutting the workpiece along the first and second cutting planes on a first side thereof and displacing the support frame for cutting the workpiece along the first and second cutting planes on a second side thereof.

3. The cutting assembly according to claim 1, wherein at least one of the first and second cutting tools is independently movable with respect to the other one of the cutting tools on the support frame.

4. The cutting assembly according claim 1, wherein the first cutting plane is substantially vertical, and the second cutting plane is angled relatively to the first cutting plane for defining a bevel along the workpiece, and wherein moving the cutting tools relative to the workpiece along a vertical axis adjusts the size of the bevel.

5. The cutting assembly according to claim 1, wherein the first cutting tool comprises an elongated portion defining a first axis, and wherein rotating the second cutting tool about the first axis adjusts the size of the bevel.

6. The cutting assembly according to claim 1, wherein the inner angle is a first inner angle and wherein the cutting assembly further comprises a third cutting tool operatively connected to the support frame and being adapted to cut the workpiece along a third cutting plane, the third cutting plane and first cutting plane defining a second inner angle therebetween.

7. The cutting assembly according to claim 6, wherein the first and second inner angles are between about 1 degree and 179 degrees.

8. The cutting assembly according to claim 6, wherein the first and second inner angles are about 45 degrees.

9. The cutting assembly according to claim 6, wherein the second inner angle is generally a mirror of the first inner angle.

10. The cutting assembly according to claim 1, wherein the support frame is rotatable on the manipulator system to change an orientation of each cutting plane with respect to the workpiece.

11. The cutting assembly according to claim 1, wherein the cutting tools are offset with respect to one another along a direction to avoid contact with each other.

12. The cutting assembly according to claim 1, wherein the manipulator system comprises an elongated bridge extending over the workpiece, and wherein the support frame is adapted to move along the elongated bridge.

13. The cutting assembly according to claim 1, wherein the manipulator system comprises a robotic arm, and wherein the support frame is rotatably connected at one end thereof.

14. The cutting assembly according to claim 1, wherein at least one of the cutting tools is one of a waterjet, a circular saw, a cutting blade, a laser, an ultrasonic knife, an ultrasonic saw and a reciprocating saw.

15. The cutting assembly according to claim 1, wherein the cutting tools are independently operational from one another.

16. The cutting assembly according to claim 1, wherein the workpiece is a piece of meat.

17. A workpiece processing system for processing a given workpiece, the system comprising:
- a conveying assembly adapted to convey the workpiece along a predetermined path; and
- a cutting assembly provided about the conveying assembly, the cutting assembly comprising:
  - a manipulator system;
  - a support frame rotatably connected to the manipulator system;
  - a first cutting tool coupled to the support frame and adapted to cut the workpiece along a first cutting plane; and
  - a second cutting tool coupled to the support frame and adapted to cut the workpiece along a second cutting plane different than the first cutting plane, the first and second cutting planes defining an inner angle therebetween,
  - the cutting assembly being adapted to cut the workpiece along the first and second cutting planes in a single operation.

18. The workpiece processing system according to claim 17, further comprising a guidance system provided about the conveying assembly and wherein the cutting assembly further comprises a manipulator system, the guidance system being operatively connected to the manipulator system for controlling the movements of the manipulator system.

19. The workpiece processing system according to claim 17, wherein the cutting assembly further comprises a third cutting tool operatively connected to the support frame and being adapted to cut the workpiece along a third cutting plane, and wherein the inner angle is a first inner angle, and the third cutting plane is angled with respect to the first cutting plane, defining a second inner angle therebetween.

* * * * *